June 13, 1950  T. E. MURRAY  2,511,365
SWITCH BOX
Filed Aug. 19, 1948
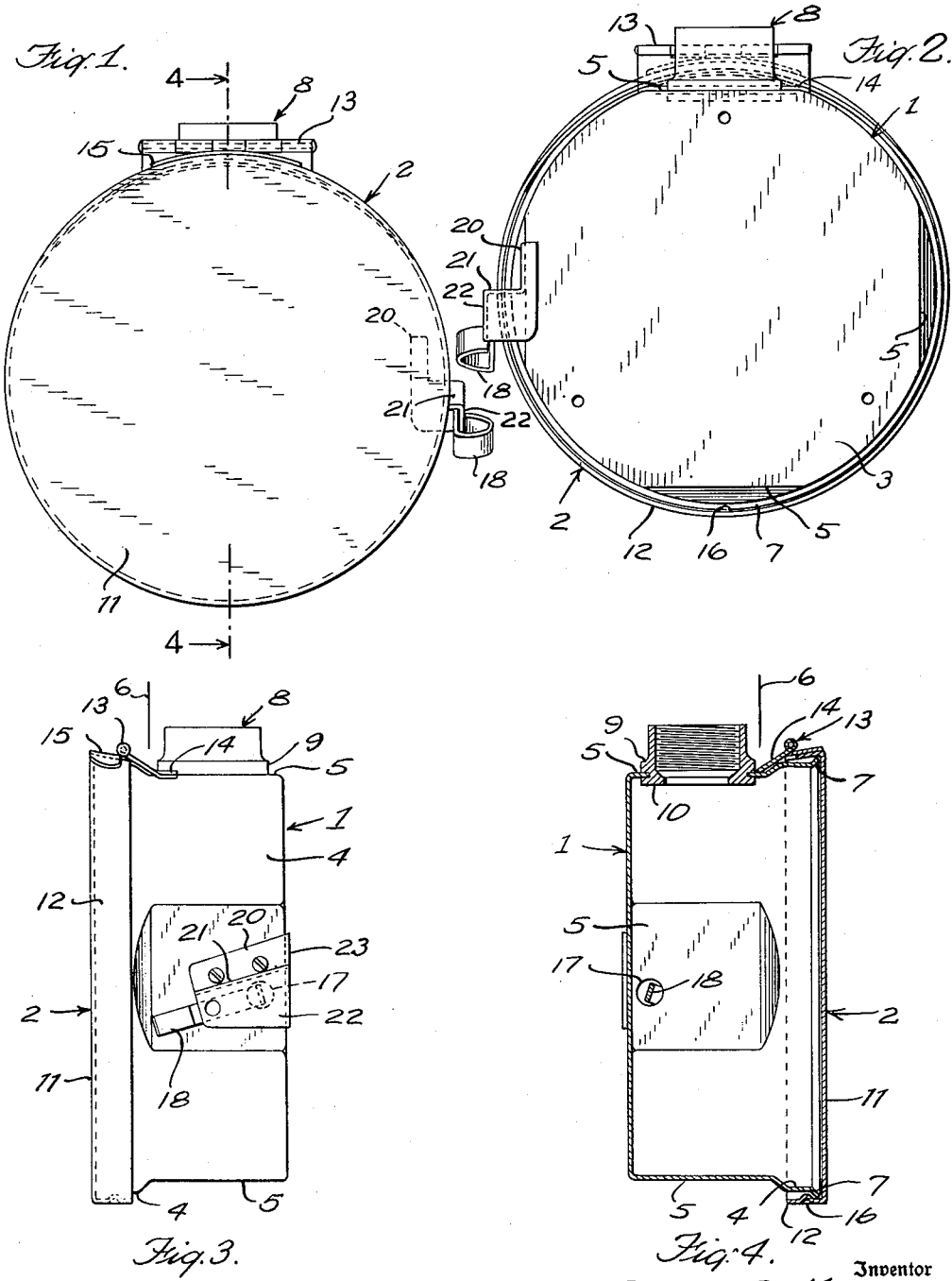
Inventor
THOMAS E. MURRAY.
By George T. Gill
Attorney Patented June 13, 1950

2,511,365

UNITED STATES PATENT OFFICE 2,511,365

SWITCH BOX

Thomas E. Murray, Brooklyn, N. Y.

Application August 19, 1948, Serial No. 45,039

3 Claims. (Cl. 200—168)

The invention herein disclosed relates to a rain-tight, electrical switch box that is especially suitable for mounting on the outside of a building.

Public utilities that supply electricity to consumers have found it expedient to mount the meters on the outside of buildings being served. This is particularly true with private dwellings, as it facilitates the reading of the meter, which must be done at regular intervals.

The primary object of this invention is to provide a rain-tight switch box that may be used in conjunction with such installations. Another object of the invention is to provide a switch box of the kind mentioned that is comparatively inexpensive to manufacture. A further object of the invention is to provide such a switch box that is attractive in appearance.

The foregoing objects and certain advantages that will hereinafter appear are realized in the switch box illustrated in the accompanying drawing, as one practical embodiment of the invention, and described in detail below, from which description a clear understanding of the invention may be had.

The drawing includes:

Fig. 1 which is a front elevation of a switch box embodying the invention;

Fig. 2 which is a rear elevation of the same;

Fig. 3 which is a side elevation of the same; and

Fig. 4 which is a sectional side elevation of the same taken on the line 4—4 of Fig. 1.

The rain-tight switch box disclosed in the drawing primarily includes a box, designated generally by the numeral 1, and a cover, designated generally by the numeral 2. The box is a drawn, sheet metal box and consists of a single piece of sheet metal. It includes an end wall 3, and a substantially cylindrical wall 4, extending laterally from the end wall 3. The wall 4 has four flat portions 5 that are symmetrically disposed about the axis of the box. These flat portions 5 extend from the end wall 3 to a point or plane, designated by the line 6, intermediate the end wall 3 and the free edge of the cylindrical wall 4. The flat portions 5 are provided so that openings may be made therethrough for the entrance of conduit or other electrical wire carrying media. By providing these flat surfaces, rain-tight connections may be made between the box and the conduit connectors that are ordinarily used in conjunction with such a switch box. At the free edge of the cylindrical wall 4, there is an out-turned, circumambient, inclined lip 7.

In one of the flat surfaces 5, an opening is provided and in this opening there is received a conduit connector 8. The conduit connector 8 is hollow and internally threaded to receive the threaded end of a conduit. The connector 8 is secured to the side wall of the box by opposed, outwardly extending flanges 9 and 10 which engage opposite surfaces of the wall of the box. The inner flange 10 is spun or riveted over so that there is a rain-tight connection between the flange 9 and the outer surface of the wall of the box. Desirably, the hole through the wall of the box is of polygonal configuration and the portion of the connector 8 which extends through the opening is complementary thereto. In this way, the connector 8 may be secured against turning, in the opening in the wall of the box, when a conduit is threaded into the connector.

The cover 2 includes an end wall 11 and a laterally extending, circular flange 12, which, in the closed position of the cover, overlaps the out-turned lip 7 on the cylindrical wall 4. The cover 2 is hingedly secured to the box 1 by a hinge 13. One side 14 of the hinge 13 is secured, as by spot welding, to the flat surface 5 to which the conduit-connector 8 is secured. The other side 15 of the hinge is secured to the flange 12 of the cover. The hinge pivot is spaced from the cover and the box so that in opening the flange 12 swings clear of the lip 7.

In the installation of the box on the side wall of a building, the flat surface 5, to which the conduit-connector 8 is secured, constitutes the top of the box. At the hinge, and more approximately through an included angle of sixty (60) degrees, the flange 12 of the cover is inclined inwardly so that in the closed position of the cover, is inclined inwardly so that in the closed position of the cover, the flange extends inwardly of the edge of the out-turned lip 7 of the wall 4. With this arrangement, even a driving rain hitting the top of the box, as the box is installed, cannot seep into the box between the flange 12 and the out-turned lip 7 of the wall of the box.

Diametrically opposite the hinge 13, the flange 12 is provided with a detent 16. In the closed position of the box, as seen in Fig. 4, this detent engages under the outturned lip 7 of the box and releasably secures the cover in the closed position.

Another flat portion 5, one spaced ninety (90) degrees from the flat portion from which the conduit-connector 8 extends, has an opening 17 provided for a switch handle 18. The switch handle 18 pivots about the axis of the opening 17 to actuate a switch within the box. The switch forms no part of this invention and has not, therefore, been disclosed in the drawing. A rainguard 19 is provided for the switch handle. This rain guard includes a flange 20 that is secured to the flat portion 5 of the wall 4 of the box; an outwardly extending, inclined wall 21 which extends over the switch arm, in the closed position of the switch; a laterally extending flange 22 which extends along the side of the switch arm in the closed position of the switch; and a base flange 23 which extends along the end wall 3. The flange 20 and the base flange 23 are secured to the side and end walls, respectively, of the box. As seen in Fig. 1, the guard wall 21, when the box is mounted in a vertical position, is inclined to the horizontal. In this way, the switch arm, and the opening 17 through which the switch arm extends, are protected against the entrance of rain water or of water running down the side of the box.

From the foregoing description of the embodiment of the invention illustrated in the drawings, it will be apparent to those skilled in the art that by this invention there is provided a rain-tight switch box that is suitable for housing a service entrance switch on the outside wall of a building; a rain-tight switch box that is comparatively inexpensive to manufacture; and a rain-tight switch box that is inconspicuous and attractive in appearance.

It will be obvious that various changes may be made by those skilled in the art in the details of the embodiment of the invention disclosed in the drawings and described above within the principle and scope of the invention as expressed in the appended claims.

I claim:

1. A rain-tight switch box adapted to be attached to the exterior wall of a building, which switch box comprises in combination a one-piece sheet metal box including an end wall and a substantially cylindrical wall extending laterally from the end wall and having an out-turned lip at the free edge thereof and flat portions symmetrically disposed about the wall and extending from the end wall to a plane intermediate the end wall and the free edge of the cylindrical wall, one of said flat portions having an opening therethrough, a hollow, internally threaded, conduit connector extending through said opening and secured to the wall in rain-tight contact therewith, and a circular cover for the box hingedly secured to the box adjacent the conduit connector having a laterally extending, circumambient flange arranged to receive the out-turned lip of the box, the flange of the cover being inwardly inclined adjacent the hinge connection to the box to extend over the out-turned lip thereof in the closed position of the cover, a switch handle extending through another flat portion of the box, and a shield for the switch handle secured to the box.

2. A rain-tight switch box adapted to be attached to the exterior wall of a building, which switch box comprises in combination a one-piece sheet metal box including an end wall and a substantially cylindrical wall extending laterally from the end wall and having an out-turned, circular lip at the free edge thereof and flat portions, symmetrically disposed about the wall and extending from the end wall to a plane intermediate the end wall and the free edge of the cylindrical wall, one of said flat portions having an opening therethrough, a hollow internally threaded, conduit connector extending through said opening and secured to the wall in rain-tight contact therewith, and a circular cover for the box hingedly secured to the box adjacent the conduit connector having a laterally extending, circumambient flange arranged to receive the out-turned lip of the box, the flange of the cover being inwardly inclined adjacent the hinge connection to the box to extend over the out-turned lip thereof in the closed position of the cover, and having a detent diametrically opposite the hinge connection for releasably engaging the lip to secure the cover in the closed position, a switch handle extending through another flat portion of the box, and a shield for the switch handle secured to the box.

3. A rain-tight switch box adapted to be attached to the exterior wall of a building, which switch box comprises in combination a one-piece sheet metal box including an end wall and a substantially cylindrical wall extending laterally from the end wall and having an out-turned lip at the free edge thereof and flat portions symmetrically disposed about the wall and extending from the end wall to a plane intermediate the end wall and the free edge of the cylindrical wall, one of said flat portions having an opening therethrough, a hollow, internally threaded, conduit connector extending through said opening and secured to the wall in rain-tight contact therewith, a circular cover for the box having a laterally extending circumambient flange arranged to receive the out-turned lip of the box, the flange of the cover being inwardly inclined adjacent the conduit connector to extend over the out-turned lip in the closed position of the cover, and a hinge connected to the cover and the box adjacent said conduit connector, the axis of the hinge being spaced from the cover and the box whereby the inwardly inclined portion of the flange of the cover swings clear of the out-turned lip on opening movement of the cover.

THOMAS E. MURRAY.

REFERENCES CITED

The following references are of record in the file of this patent:

UNITED STATES PATENTS

| Number | Name | Date |
| --- | --- | --- |
| 1,102,869 | Carmer et al. | July 7, 1914 |
| 2,087,589 | Bonnell et al. | July 20, 1937 |